US007619989B2

(12) United States Patent
Guingo et al.

(10) Patent No.: US 7,619,989 B2
(45) Date of Patent: Nov. 17, 2009

(54) ROUTING CONFIGURATION VALIDATION APPARATUS AND METHODS

(75) Inventors: Pierrick Jacques Guingo, Ottawa (CA); Fernando Cuervo, Ottawa (CA)

(73) Assignee: Alcatel Lucent, Paris (FR)

( * ) Notice: Subject to any disclaimer, the term of this patent is extended or adjusted under 35 U.S.C. 154(b) by 563 days.

(21) Appl. No.: 11/213,010

(22) Filed: Aug. 26, 2005

(65) Prior Publication Data
US 2007/0047464 A1    Mar. 1, 2007

(51) Int. Cl.
H04L 12/28 (2006.01)
(52) U.S. Cl. ............... 370/254; 370/351; 370/389; 370/401
(58) Field of Classification Search ............... None
See application file for complete search history.

(56) References Cited

U.S. PATENT DOCUMENTS

| | | | | |
|---|---|---|---|---|
| 5,926,463 | A * | 7/1999 | Ahearn et al. | 370/254 |
| 6,914,886 | B2 * | 7/2005 | Peles et al. | 370/254 |
| 7,334,045 | B1 * | 2/2008 | Jacobson et al. | 709/238 |
| 2002/0099842 | A1 | 7/2002 | Jennings et al. | |
| 2002/0186664 | A1 * | 12/2002 | Gibson et al. | 370/254 |
| 2003/0112809 | A1 | 6/2003 | Bharali et al. | |
| 2004/0258074 | A1 * | 12/2004 | Williams et al. | 370/395.5 |
| 2005/0254438 | A1 * | 11/2005 | Turk et al. | 370/254 |
| 2006/0098587 | A1 * | 5/2006 | Vasseur et al. | 370/254 |
| 2006/0101026 | A1 * | 5/2006 | Fukushima | 707/100 |
| 2006/0114838 | A1 * | 6/2006 | Mandavilli et al. | 370/254 |
| 2006/0209716 | A1 * | 9/2006 | Previdi et al. | 370/254 |
| 2006/0262734 | A1 * | 11/2006 | Appanna et al. | 370/254 |
| 2006/0291446 | A1 * | 12/2006 | Caldwell et al. | 370/351 |

FOREIGN PATENT DOCUMENTS

WO    WO 01/61598 A1    8/2001

OTHER PUBLICATIONS

Y. Rekhter et al., "Address Allocation for Private Internets," Network Working Group Memo, Feb. 1996.

* cited by examiner

*Primary Examiner*—Huy D. Vu
*Assistant Examiner*—Brandon Renner
(74) *Attorney, Agent, or Firm*—Smart + Biggar (57) ABSTRACT

Apparatus, methods, and related data structures for validating a routing configuration in a communication system are disclosed. Routing information in a communication system is passively collected, illustratively from routing protocol advertisement messages. A routing configuration of the communication system is validated based on the collected routing information. Validation may involve comparing information associated with electronic addresses in an address space of the communication system with the collected routing information, and also or instead comparing an intended routing configuration with an explicit routing configuration, for example. A data structure may include information indicating an electronic address and information indicating a result of validating a routing configuration associated with the electronic address.

20 Claims, 4 Drawing Sheets

ROUTING CONFIGURATION VALIDATION APPARATUS AND METHODS

FIELD OF THE INVENTION

This invention relates generally to electronic communications and, in particular, to validating routing configurations used in a communication network.

BACKGROUND

The global Internet Protocol (IP) address space currently offers a theoretical maximum of 4,294,967,296 hosts ($2^{32}$). In reality, this address space has been allocated in fairly large contiguous blocks. Address allocation authorities distribute blocks of the IP address space to individual organizations interconnected through networks that make up the Internet as a whole.

These address blocks must be globally reachable according to routing information exchanged via routing protocols such as Border Gateway Protocol (BGP), Open Shortest Path First (OSPF), and Intermediate System to Intermediate System (IS-IS). Routing information, which is both used locally and exchanged with peers, generally refers to address blocks in terms of an IP address and a mask, called a Classless Inter-Domain Routing (CIDR) block. For example, an IP address block written 192.172.226/24 refers to all IP addresses having the same prefix for the first 24 bits (i.e. 192.172.226). This block starts at address 192.172.226.0 and contains 256 possible individual IP addresses ($2^{32-24}$). Routing tables associate this IP address block, which includes an address/mask pair, with a next hop IP address, and routers forward all traffic with a destination IP address in this block to the next hop listed in their local routing tables.

IP address assignment and other routing configuration functions are strongly related to each other. The fact that they are typically configured separately, however, tends to prevent them from being seen at the same time, leading to potential inconsistencies between intended and actual configurations.

Previous work has attempted to show how much of the IPv4 address space, i.e., $2^{32}$ possible individual hosts, is in use in the global Internet core using BGP routing tables. This work generated a simple map of 16,777,216

$$\left(\frac{2^{32}}{256}\right),$$

possible clusters of 256 hosts with 24-bit CIDR blocks. This map of the global address space showed whether each address block was routable and whether it was allocated to some organization. A BGP routing table was used to determine whether address blocks were routable, and reverse Domain Name System (DNS) lookups were used to determine allocation. The BGP routing table used to generate the map was collected from a Route View server storing BGP routes from 15 peers spread throughout the Internet.

One of the roles of BGP is to minimize the number of IP address blocks advertised between peers by summarizing small blocks in larger blocks, thus causing a loss of granularity. When trying to retrieve the IP address space in use from BGP routing tables, one can only accurately assert which IP address blocks are not reachable. Information about small IP address blocks which may be allocated and routed in the network is thus lost. Furthermore, this methodology does not show IP addresses used by transport devices such as routers.

According to another technique called scanning, query probes such as ping packets are sent to each possible individual IP address. If a response to the query is received, then the IP address is assessed as in use. Scanning all of the IP addresses allocated in a network may be seen as the most accurate way to evaluate which ones are reachable. Still, this solution faces a number of problems, including a) scalability: scanning all possible IP addresses is a tremendous process which has to be repeated often in order to get an up-to-date image of the IP address space in use, b) security: hosts might be configured to not respond to query probes for security purposes and yet still be active to send and/or receive traffic, and c) filtering: probes might not be forwarded to protect the system from possible attacks. This scheme is therefore not entirely accurate.

A further conventional technique uses a Dynamic Host Configuration Protocol (DHCP) server to automate the assignment of IP addresses to each host in a system. This solution keeps track of the IP addresses assigned, and these addresses are assumed to be reachable. Although one might consider that keeping track of IP addresses automatically assigned by a DHCP server would allow an accurate assessment of which IP addresses are in use in the network, this assignment is not correlated with the actual configuration of equipment in the network. The assignment of an IP address to a host thus only reflects the intent to use this IP address, but does not guarantee its reachability, that is, whether it will actually be routed in a network. Such an IP address represents an inconsistency between the DHCP server and actual configuration, but is mistakenly considered allocated and thus reachable according to this solution.

The above techniques do not provide an accurate assessment of which blocks of the IP address space are reachable in a communication system, or provide for detection of potential routing configuration issues or errors such as inconsistencies between intended address assignments and actual configurations.

Therefore, there remains a need for apparatus and methods for validating routing configuration, such as to verify the reachability of electronic addresses in communication systems.

SUMMARY OF THE INVENTION

Embodiments of the invention enable detection of conditions which may affect transfer of information in a communication system. In one embodiment, determinations are made as to which blocks of an IP address space are reachable in a communication network. Reachable address space blocks are compared with the blocks allocated by a network management application such as an address space manager in order to detect possible misconfigurations between intended and IP address assignments and actual configurations. Other conditions such as addressing policy violations, address hijacking, and lost addresses may also be detected.

According to an aspect of the invention, there is provided an apparatus for validating routing configuration in a communication system, the apparatus comprising a listener configured to passively collect routing information in a communication system, and a routing configuration validation module configured to validate a routing configuration of the communication system based on the collected routing information.

The routing configuration validation module may be configured to validate a routing configuration by performing one or more of: comparing information associated with electronic addresses in an address space of the communication system with the collected routing information, and comparing an intended routing configuration with an explicit routing configuration.

In one embodiment, the listener includes a plurality of address reflectors configured to passively collect the routing information by collecting information associated with electronic addresses which are reachable in respective areas of the communication system, and an address aggregator operatively coupled to the plurality of address reflectors and configured to receive the information associated with reachable electronic addresses from the plurality of address reflectors, and to store the received information in a data store.

The listener may be configured to passively collect the routing information by establishing respective adjacencies with one or more routing elements in the communication system.

In one embodiment, the routing information comprises Internet Protocol (IP) addresses.

The listener may also or instead passively collect the routing information by receiving routing information distributed by one or more routing elements in the communication system. The collected routing information may include one or more of: a reachable electronic address used to route communication traffic in the communication system, a Classless Inter-Domain Routing (CIDR) block mask, a source electronic address of the routing element distributing the routing information, and an electronic address of a next hop from the source electronic address toward the reachable electronic address. The collected routing information may include routing information distributed according to a protocol selected from the group comprising: Border Gateway Protocol (BGP), Open Shortest Path First (OSPF), and Intermediate System to Intermediate System (IS-IS).

In one embodiment, the routing configuration management system is further configured to determine, based on one or more of a source of the collected routing information and content of the collected routing information, whether the routing configuration should be validated, and to validate the routing configuration responsive to a determination that the routing configuration should be validated.

The routing configuration validation module may be further configured to retrieve the information associated with the electronic addresses in the address space from an address space management system.

The routing configuration validation module may be further configured to determine a combined allocation and reachability status of an electronic address based on comparing the information associated with electronic addresses in the address space with the collected routing information, and to provide an indication of the combined allocation and reachability status.

Where the apparatus includes a display operatively coupled to the routing configuration validation module, the indication of the combined allocation and reachability status may be a status indication displayed on the display.

In one embodiment, the routing configuration validation module is configured to determine a combined allocation and reachability status for a plurality of electronic addresses, the routing configuration validation module is configured to provide an indication of the combined allocation and reachability status of each of the plurality of electronic addresses, and the displayed status indications comprise an address map, a position of a status indication for an electronic address in the address map corresponding to a value of the electronic address, and a color of a status indication for an electronic address in the address map corresponding to the combined allocation and reachability status of the electronic address.

A routing configuration validation system comprising an apparatus according to an embodiment of the invention may be provided in a communication system comprising one or more routing elements for routing communication traffic in the communication system and a routing configuration management system for managing routing configuration in the communication system, and be operatively coupled to the each of the one ore more routing elements and to the routing configuration management system.

The present invention also provides, in another aspect, a method of validating routing configuration in a communication system. The method involves passively collecting routing information in a communication system, and validating a routing configuration of the communication system based on the collected routing information.

These operations may be performed in any of various ways, and the method may also include further operations, some of which have been briefly described above.

A machine-readable medium storing a data structure is also provided. The data structure includes information indicating an electronic address in a communication system, and information indicating a result of validating a routing configuration, associated with the electronic address, in the communication system.

The information indicating a result of validating a routing configuration may include information indicating an allocation status and a reachability status of the electronic address.

In one embodiment, the data structure also includes information indicating one or more attributes of the electronic address.

Other aspects and features of the present invention will become apparent to those ordinarily skilled in the art upon review of the following description of specific illustrative embodiments thereof.

BRIEF DESCRIPTION OF THE DRAWINGS

Examples of embodiments of the invention will now be described in greater detail with reference to the accompanying drawings, in which.

DETAILED DESCRIPTION OF PREFERRED EMBODIMENTS

Figure 1:
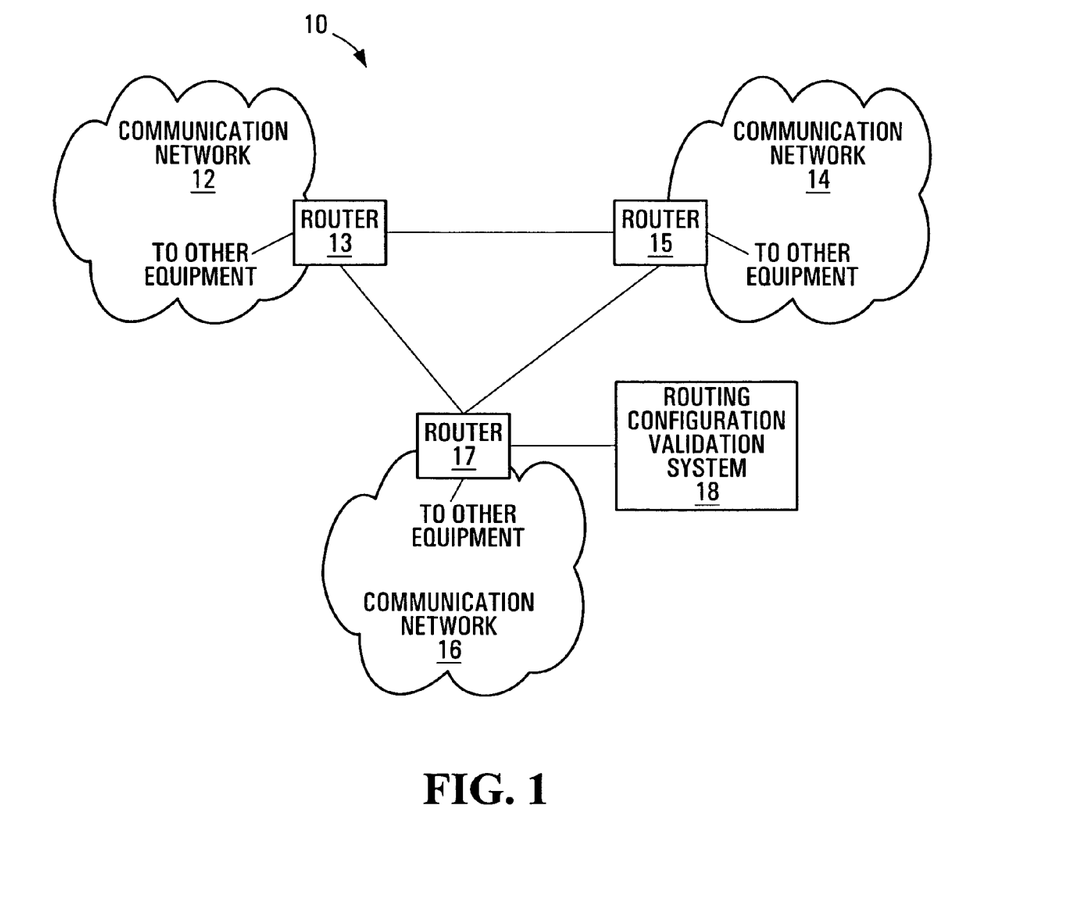
FIG. 1 is a block diagram of a communication system incorporating an embodiment of the invention.

FIG. 1 is a block diagram of a communication system 10 incorporating an embodiment. The communication system 10 includes communication networks 12, 14, 16, which are interconnected through respective routers 13, 15, 17. A routing configuration validation system 18 is operatively coupled to one or more of the routers, the router 17 in the example shown in FIG. 1.

The particular system topology and components shown in FIG. 1 are intended solely for illustrative purposes, and not to limit the scope of the invention. For example, a communication system may include fewer or more than three communication networks 12, 14, 16 and/or different inter-network connections than explicitly shown in FIG. 1. Communication networks also generally include additional routers and other equipment, which have not been shown in FIG. 1 to avoid congestion. It should therefore be appreciated that the system of FIG. 1, as well as the contents of the other drawings, are intended solely for illustrative purposes, and that the present invention is in no way limited to the particular example embodiments explicitly shown in the drawings and described herein.

The communication networks 12, 14, 16 represent interconnected communication equipment through which communication traffic is transferred. End user equipment (not shown) which is operatively coupled to the communication network 12, for example, can exchange communication traffic with other equipment in the network 12, and, through the border routers 13, 15, 17, with equipment in the other networks 14, 16.

Those skilled in the art will be familiar with the structure and operation of various examples of different communication equipment, media, and communication protocols which may be implemented in the communication networks 12, 14, 16. The networks 12, 14, 16 are therefore described herein only to the extent necessary to provide an understanding of embodiments of the present invention. Routing configuration validation or verification as disclosed herein may be substantially independent of particular operations involved in using routing information such as electronic addresses in transferring communication traffic. Accordingly, communication traffic processing by the network 12, 14, 16 is not described in substantial detail.

In the system 10, the routers 13, 15, 17 provide for transfer of communication traffic between the networks 12, 14, 16. To support this functionality, each router advises the other routers of routing information such as electronic addresses which it can reach, i.e., the electronic addresses to which it is able to transfer traffic.

Routing protocol messages represent one example of a mechanism through which routers exchange routing information, which as noted above may include information associated with reachable electronic addresses. These control messages naturally flow throughout each network 12, 14, 16, and in the system 10, between these networks, to ensure that the routers 13, 15, 17 arrive at a common view of the system 10. Common routing protocols include BGP, OSPF, and IS-IS, although routing information may also or instead be exchanged through various other protocols.

According to an embodiment of the invention, the routing configuration validation system 18 builds a map of electronic addresses, illustratively IP addresses, which are reachable in the system 10 from data which is passively collected from routing protocol messages.

Address reachability represents one operating characteristic which could be assessed in accordance with the techniques disclosed herein. Other routing conditions may also or instead be of interest to an operator or manager of a communication system. Examples of these conditions and their detection are described in further detail below.

Figure 2:
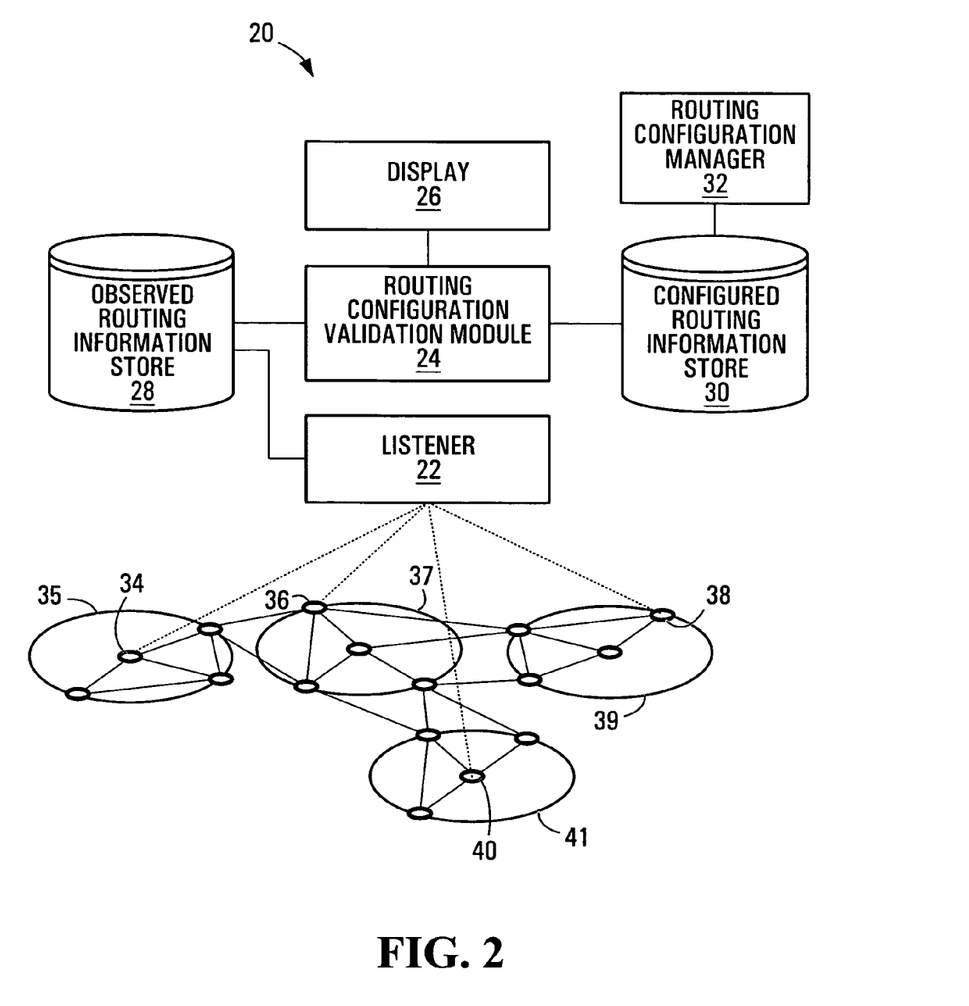
FIG. 2 is a block diagram of a routing configuration validation system.

FIG. 2 is a block diagram of a routing configuration validation system 20. The system 20 includes a listener 22 operatively coupled to an observed routing information store 28, a routing configuration validation module 24 operatively coupled to the observed routing information store 28, to a display 26, and to a configured routing information store 30, and a routing configuration manager 32 operatively coupled to the configured routing information store 30. The listener 22 is also operatively coupled to routers 34, 36, 38, 40 in respective communication networks or areas 35, 37, 39, 41.

The listener 22 and the routing configuration validation module 24 may be implemented primarily in software for execution by a processor such as a microprocessor, digital signal processor (DSP), application specific integrated circuit (ASIC), Field Programmable Gate Array (FPGA), or other programmable component. However, hardware-based embodiments of the listener 22 and the routing configuration validation module 24 are also contemplated.

The display 26 represents one example of a component which may be used in providing an indication of the results of processing performed by the routing configuration validation module 24. The type of the display 26 will be dependent upon the type of equipment in which the system 20 is implemented. In a personal computer system or workstation, for example, the display 26 might be a cathode ray tube (CRT) display or a liquid crystal display (LCD).

Routing information, including information associated with electronic addresses which are reachable in a communication system for instance, is collected by the listener 22 and stored in the store 28. Configured routing information, such as information associated with electronic addresses in an address space of the communication system, is stored in the store 30.

The configured routing information store 30 may include information on all of the addresses which may be used in a communication system, whether or not these addresses have actually been assigned or allocated for use in the communication system or communication equipment has been configured to transfer communication traffic using these addresses. Address space information stored in the store 30 preferably includes at least an indication of the allocation status of the addresses or address blocks of the total address space of a communication system.

The data stores 28, 30 may be implemented in separate storage devices or in the same storage device, in respective areas of a memory device, for example. The memory device(s) in which the data stores 28, 30 are provided may include solid state memory devices or memory devices for use in conjunction with movable or even removable storage media.

The routing configuration manager 32 represents a component which allows electronic addresses to be allocated in a communication system. One implementation of the routing configuration manager 32 is a software application for execution at a Network Management System (NMS). Although shown as a single functional block in FIG. 2, the routing configuration validation module 24 may include multiple components or functions, such as an address manager through which intended routing configurations are specified and a configuration application or interface through which actual configurations for routers and/or other communication equipment may be controlled.

The routing configuration manager 32 may be co-located or implemented on the same equipment as the listener 22 and the routing configuration validation module 24, although this need not necessarily be the case. The routing configuration validation module 24 may validate configuration and allocation of electronic addresses for instance, but may be implemented independently of these functions and on different equipment.

In operation, the listener 22 collects routing information in a communication system. According to one embodiment, the listener 22 receives, in real-time, routing protocol messages which are exchanged on a control plane between the routers 34, 36, 38, 40 in order for those routers to route traffic through the networks 35, 37, 39, 41, and extracts information from the routing protocol messages. The listener 22 has full visibility of the address blocks advertised by the routers 34, 36, 38, 40, and stores collected information in the reachable address information store 28.

Figure 3:
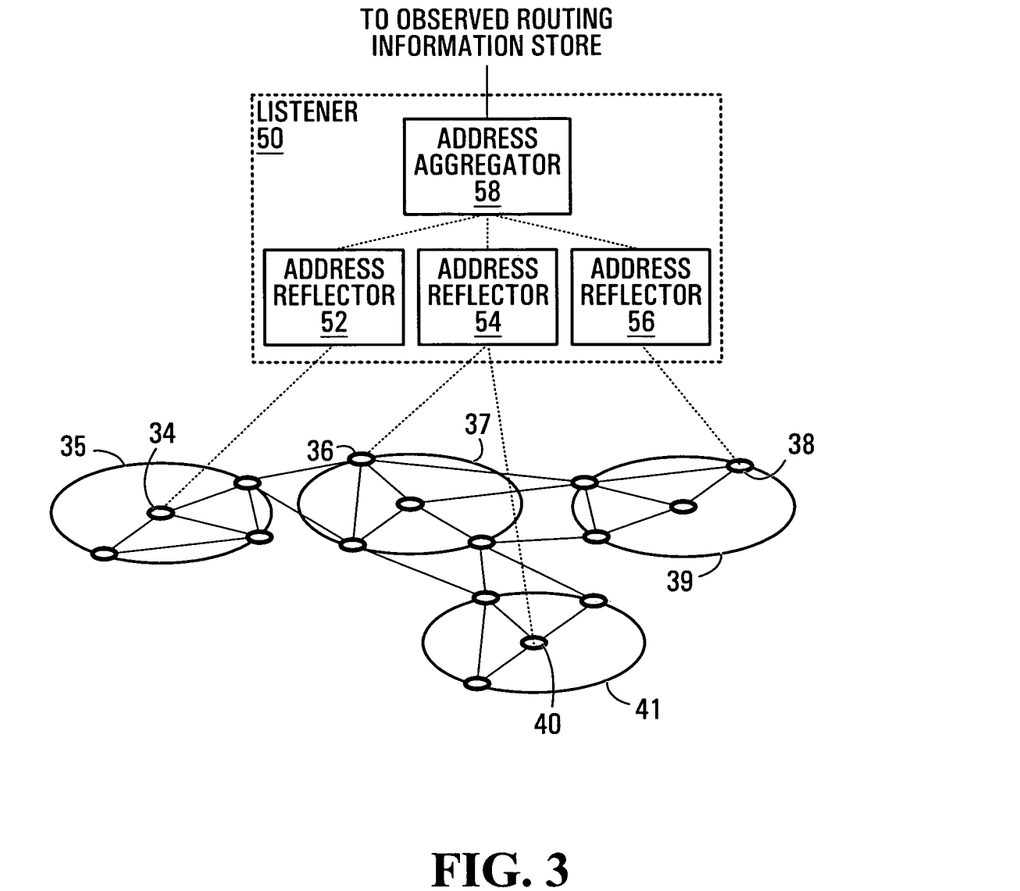
FIG. 3 is a block diagram of a listener.

One particular embodiment of a listener is shown in further detail in the block diagram of FIG. 3. In FIG. 3, the listener 50 includes address reflectors 52, 54, 56, which are operatively coupled to respective groups of one or more of the routers 34, 36, 38, 40. An address aggregator 58 is operatively coupled to the address reflectors 52, 54, 56. The listener 50, like the listener 22, may be implemented primarily in software, hardware, or some combination thereof.

To monitor address blocks which are in use in the communication system comprising the networks 35, 37, 39, 41, the address reflectors 52, 54, 56 passively and in real-time collect routing information, and in particular reachable address information in the embodiment of FIG. 3, from respective routing areas. Reachable address information may be collected by the reflectors 52, 54, 56 in the form of IP address blocks advertised by routing protocols, for example.

According to one embodiment, the address reflectors 52, 54, 56 establish direct adjacencies with one or more routers in respective routing areas which are defined by routing protocols used by the routers 34, 36, 38, 40. These adjacencies are illustrated by the dashed lines in FIG. 3. In establishing an adjacency, an address reflector 52, 54, 56 effectively advertises itself to one or more routers as another router, so that it will receive routing protocol messages from its adjacent router(s).

The address reflectors 52, 54, 56 and the routers 34, 36, 38, 40 may thus have substantially similar control plane components for receiving routing protocol information. Whereas the routers transmit routing information, however, the address reflectors 52, 54, 56 do not route communication traffic and therefore need not advertise reachable addresses to their adjacent routers.

An address reflector may monitor one area, as in the case of the address reflectors 52, 56 which respectively monitor the routing areas of the networks 35, 39. The address reflector 54 monitors multiple routing areas covering the networks 37, 39.

Each address reflector 52, 54, 56 transfers, or "reflects" the electronic addresses or blocks it has seen, along with their attributes, to the address aggregator 58 for analysis, preferably real-time analysis. The address aggregator 58 may filter routing information which includes the same electronic addresses or blocks and has the same attributes, and stores them in the observed information store.

The address aggregator 58 may also keep track of electronic addresses or blocks which have the same electronic address value(s) but different attributes. This allows the address aggregator 58 to identify possible problems in routing configurations such as address assignments or configuration of equipment, in the case of addresses which have been allocated but not routed for example. A flag or other indicator in the observed routing information store, or a separate "problem" address store, for instance, may be used to provide this tracking capability.

The routing information collected by the listener 50 may include a reachable electronic address and/or attributes extracted from routing protocol advertisements, such as a CIDR block comprising an IP address and a mask, a source IP address of the advertisement, and a next hop IP address toward the reachable address.

Referring again to FIG. 2, the observed routing information in the store 28 is compared or correlated by the routing configuration validation module 24 with information in the store 30, which may indicate the configuration intended when the address was allocated, for example. The intended configuration is specified in the system 20 through the routing configuration manager 32, which may include a DHCP server for instance.

An indication of a combined reachability and allocation status determined by the routing configuration validation module 24 may also be provided. In the system 20, a visual status indication is provided on the display 26, although other types of indication may be provided instead of or in addition to a visual indication. Remote indications, in which status information is transmitted to a remote system for display and/or other processing, are also contemplated.

According to one embodiment, status indications for the reachable addresses and/or the addresses in the address space of the communication system are provided in an address map. In an address map, the position and color of status indications for addresses or blocks may correspond to the value and status, respectively, of each address. For example, addresses or blocks of a monitored address space may be displayed in numerical order with (i) allocated and reachable addresses or blocks in green, (ii) allocated but not reachable addresses or blocks, which have not been advertised by routers and thus not routed, in yellow, (iii) not allocated but reachable addresses or blocks such as private address blocks in red, and (iv) not allocated and not reachable addresses or blocks in white. Other display layouts, orders, colors, etc. for status indications are also contemplated.

An address map may provide indications of other information for an address space, such as possible configuration errors. As described above, the address aggregator 58 may be configured to detect conflicting attributes for the same addresses or address blocks. Including an indication of such conflicts or other possible problems with addresses or address blocks in an address map provides a more complete representation of the current state of the address space of a communication system.

It should therefore be appreciated that address reachability and allocation status determination is an illustrative example of a validation operation which may be performed on the basis of collected routing information. Other validation operations are also possible.

For example, configuration errors may arise when addresses are allocated using an address space manager or similar application, when communication equipment is configured using a configuration interface or application, or both. As noted above, allocation and configuration are typically implemented separately and accordingly an intended routing configuration is not always correctly reproduced in an actual explicit routing configuration which is applied to communication equipment. Address management and configuration functions are represented in FIG. 2 by the single routing configuration manager 32.

An intended routing configuration may include configuration information which is specified by a communication system operator or other personnel. An operator may assign a particular address or a particular address block, in the form of an address prefix in some embodiments, to a specific customer site for instance.

Addressing or routing policies are another form of intended routing configuration. A policy may specify prefix sizes and/or restrict pools of particular addresses or address blocks to respective routers, for example. Policy information may be stored in a data store, such as the store 30 (FIG. 2), for use in validating a routing configuration.

Any discrepancy between intended and explicit routing configurations represent configuration errors which may affect the transfer of communication traffic in a communication system. Communication equipment might not be correctly configured in accordance with an address assignment specified by an operator for instance. In addition, an equipment configuration which is correct in terms of address assignment might still be in violation of routing policies. Configuration of equipment for routing incorrect addresses, address pool to router mismatch, incorrect prefix assignment to a customer, incorrect prefix size, and overlapping prefix assignments are all examples of routing configuration errors which may arise during address allocation and communication equipment configuration.

Configuration errors may also be introduced by communication equipment itself, if electronic addresses which are no longer in use are not returned to an address pool for re-assignment. This situation, in which an address is effectively "lost", may arise when equipment associated with an electronic address is removed from service, but a router which has been configured to route communication traffic to that equipment continues to advertise the address.

Other types of routing issues may also or instead be detected according to the techniques disclosed herein. The configuration errors described above would normally arise from incorrect address allocations or communication equipment configurations. It should be appreciated that a communication system may be subjected to malicious attacks such as address hijacking, where an unauthorised party attempts to seize and use the electronic address which has been allocated to another party. An address pool to router mismatch or an overlapping prefix error, for example, may be a result of a configuration error or an address hijacking attempt. Problems detected in accordance with embodiments of the invention are thus not necessarily restricted to unintentional errors.

Embodiments of the invention allow either or both of configuration errors and other potential problems to be detected by validating a routing configuration based on routing information observed in a communication system.

Collection of routing information and correlation of collected routing information with configured routing information to determine a combined allocation and reachability status of electronic addresses has been described in detail above. Some types of configuration error may similarly be detected by comparing collected routing information with configured routing information. A routing advertisement message which is received from a source other than a router specified in configured routing information may be indicative of an incorrect address or prefix assignment or a pool to router mismatch, for example. Prefix and/or prefix size discrepancies may be detected in a substantially similar manner by comparing collected and configured routing information.

Explicit routing configurations should be consistent with intended routing configurations in order to avoid communication traffic transfer problems in a communication network. Policy violations, and possibly other problems, may be detected by comparing intended and explicit routing configurations.

Collected routing information need not necessarily be used in validating a routing configuration. A routing configuration may be validated by comparing an intended routing configuration with an explicit routing configuration, for example. In this case, a determination as to whether this comparison should be performed is preferably made based on the collected routing information.

A comparison of intended and explicit routing configurations may be in order where routing information associated with the same address or overlapping address blocks includes different attributes or is received from different sources for instance. A higher than normal rate of baseline route changes or Link State Advertisement (LSA) messages may also be indicative of a potential problem. Where an attacker is attempting to hijack an address, for example, each advertisement message from the "legal" router may cause a hijacking router to send an advertisement message, and vice-versa. This would result in a higher than normal rate of advertisement messages, which may be detected by a routing configuration validation module and cause a validation operation to be initiated. The collected routing information may also be used in the validation operation.

An indication of the results of a routing configuration validation may be provided, in a network map for instance. In this case, colors and/or other display attributes may be used to indicate that the routing configuration associated with an address has been validated or that potential problems have been detected.

Figure 4:
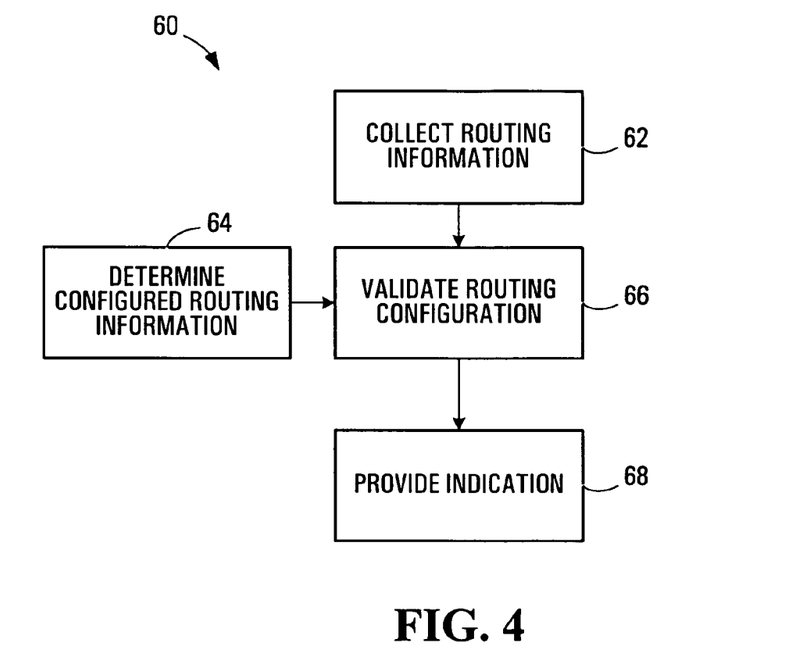
FIG. 4 is a flow diagram of a method according to an embodiment of the invention.

Although described above primarily from a system or apparatus perspective, aspects of the present invention may also be embodied in address validation or verification methods. FIG. 4 is a flow diagram of one such method.

The method 60 involves an operation 62 of epassively collecting routing information in a communication system. Configured routing information, such as information associated with electronic addresses in an address space of the communication system, is determined at 64. This may involve interactions with an address space management system or an address space store which is managed by such a system, for instance.

At 66, a routing configuration is validated on the basis of at least the collected routing information. As described above, this may involve using the collected routing information to decide whether a validation operation should be performed, using the collected routing information to perform the validation operation, or both. In one embodiment, the collected routing information includes reachable electronic address information and is compared and preferably correlated with address space information.

An indication of validation results, possibly along with other information, is provided at 72.

The operations of the method 60 may be repeated for different addresses or address blocks, illustratively each time routing information is received. Where the routing information includes information associated with multiple addresses or address blocks, then the operations may be repeated for each address or address block or performed substantially simultaneously for all addresses or address blocks. In the former case, the operations are iterated for an address or address block as the information for that address or address block is extracted from the routing information. The method 60 is completed for that address or address block and then repeated for a next address or address block included in the routing information. According to the latter scheme, information for all addresses or address blocks is extracted at 62, and the other operations progress substantially in parallel for multiple addresses or address blocks.

Various possible ways of performing the operations of the method 60 will be apparent from the foregoing description of system or apparatus embodiments of the invention.

It should also be appreciated that embodiments of the present invention may involve further or fewer operations than those explicitly shown in FIG. 4, and/or performing operations in a different order. For example, the method 60 may be initiated to confirm that an electronic address is reachable. In this case, configured routing information associated with the address might be determined at 64 before routing information has been received or otherwise collected at 62. According to another embodiment, the method 60 validates a routing configuration associated with an electronic address on receipt of routing information which includes the address. Configured routing information is then determined at 64 after routing information has been collected at 62.

Figure 5:
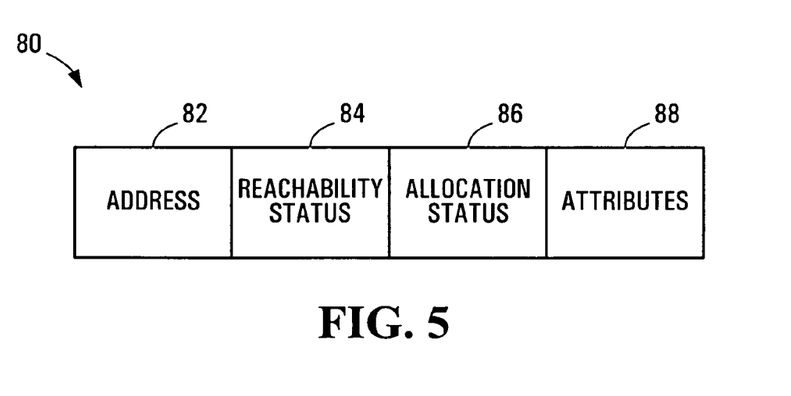
FIG. 5 is a block diagram of a data structure according to a further embodiment of the invention.

FIG. 5 is a block diagram of a data structure according to a further embodiment of the invention. The data structure 80 includes an electronic address 82, reachability status information 84, allocation status information 86, and attributes 88.

The address 82 may include, for example, an address value or, for an address block, multiple address values or a prefix value.

The reachability and status fields 84, 86 include information indicating the allocation status and the reachability status of the address 82 in a communication system. Reachability and status indications may instead be provided as a single combined reachability and allocation status in some embodiments. Similarly, one or more other validation status indications may be provided in addition to or instead of the reachability and allocation status indications.

The attributes 88 represent information which indicates at least one attribute of the address 82, and is illustrative of other types of information, in addition to status information, which may be relevant to an address or address block and stored in a data structure.

An address status data store may include multiple entries having the structure shown in FIG. 5.

Advantages of embodiments of the present invention as disclosed herein include relatively low implementation costs. A listener, including address reflectors and an address aggregator as shown in FIG. 3 for instance, may be implemented as software components running on the same machine, thus avoiding the need for hardware appliances to support the listener functionality in monitored areas of a communication system.

A further advantage of some embodiments is ease of deployment. Address reflectors may be implemented as routing daemons, for example, which are dynamically activated to remotely create adjacencies with routers.

Address space functions as disclosed herein are also resource friendly. Routing protocol updates or other reachability information may be passively received, from the peering routers for instance, avoiding resource-expensive mechanisms like Simple Network Messaging Protocol (SNMP) which extract the full routing information base (RIB) from routers. According to the disclosed techniques, there is also no need to flood a communication system with scanning probes.

By collecting routing information advertised by routing elements, embodiments of the invention provide for real-time address space processing. Updates are received as soon as they are advertised by routers. Monitoring of standardized routing protocols in this manner also provide for true vendor independence.

Considering the example of an IP network, network subscribers currently manage their own internal IP address assignments, thereby permitting duplication that could impede movement to packet-based communications such as IP telephony. With the complexity driven by both an increasing number of network subscribers and a desire to manage disparate blocks of IP addresses at the network edge, this current scheme is prone to the problem of validating the consistency between the allocation of IP addresses and their routing counterpart. Embodiments of the invention provide a solution to this problem without incurring considerable overhead in overlay management systems to collect and correlate IP address assignment configuration with routing information obtained from different sources.

What has been described is merely illustrative of the application of principles of the invention. Other arrangements and methods can be implemented by those skilled in the art without departing from the scope of the present invention.

For example, communication systems in which embodiments of the invention are implemented need not necessarily include different communication networks. A company, having been assigned a group of network addresses which are available in a communication network, may subdivide those addresses among its different branches, with each branch being responsible for routing configurations. Embodiments of the present invention allow the company to validate its assigned network address space against reachable addresses in the same communication network. Thus, in this case, the communication system includes a single network.

The present invention is also not dependent upon particular equipment architectures. Equipment in which the system 20 (FIG. 2) is implemented may include fewer or further components than those shown. For instance, a basic implementation of an address space validation system might include only the listener 22 and the routing configuration validation module 24, with the routing configuration manager 32 and the configured routing information store 30 being provided in different equipment. Routing configuration validation functions also preferably do not preclude other functions, such that equipment may include other functional components which have not been shown in order to avoid congestion.

In addition, although described primarily in the context of methods and systems, other implementations of the invention are also contemplated, as instructions stored on a machine-readable medium, for example.

We claim:

1. Apparatus for detecting possible misconfigurations in a communication system, the apparatus comprising:

a listener configured to passively collect routing information from routing protocol messages distributed by one or more routing elements in a communication system, the collected routing information indicating electronic addresses that are reachable in the communication system; and a routing configuration validation module configured to detect possible misconfigurations in the communication system by comparing the collected routing information with information indicating whether electronic addresses in an address space of the communication system have been assigned for use in the communication system, and detecting a possible misconfiguration of an electronic address where (i) the collected routing information indicates that the electronic address is reachable in the communication system and the information indicating whether the electronic addresses in the address space of the communication system have been assigned for use in the communication system indicates that the electronic address has not been assigned for use in the communication system, or (ii) the information indicating whether the electronic addresses in the address space of the communication system have been assigned for use in the communication system indicates that the electronic address has been assigned for use in the communication system and the collected routing information does not indicate that the electronic address is reachable in the communication system.

2. The apparatus of claim 1, wherein the listener comprises:

a plurality of address reflectors configured to passively collect the routing information by collecting information associated with electronic addresses which are reachable in respective areas of the communication system; and an address aggregator operatively coupled to the plurality of address reflectors and configured to receive the information associated with reachable electronic addresses from the plurality of address reflectors, and to store the received information in a data store.

3. The apparatus of claim 1, wherein the listener is configured to passively collect the routing information by establishing respective adjacencies with one or more of the routing elements in the communication system.

4. The apparatus of claim 1, wherein the routing information comprises Internet Protocol (IP) addresses.

5. The apparatus of claim 1, wherein the collected routing information comprises one or more of: a reachable electronic address used to route communication traffic in the communication system, a Classless Inter-Domain Routing (CIDR) block mask, a source electronic address of the routing element distributing the routing information, and an electronic address of a next hop from the source electronic address toward the reachable electronic address.

6. The apparatus of claim 1, wherein the collected routing information comprises routing information distributed according to a protocol selected from the group comprising: Border Gateway Protocol (BGP), Open Shortest Path First (OSPF), and Intermediate System to Intermediate System (IS-IS).

7. The apparatus of claim 1, wherein the routing configuration validation module is further configured to determine, based on one or more of a source of the collected routing information and content of the collected routing information, whether the collected routing information should be compared with the information indicating whether the electronic addresses in the address space have been assigned for use in the communication system, and to compare the collected routing information responsive to a determination that the routing information should be compared.

8. The apparatus of claim 1, wherein the routing configuration validation module is further configured to retrieve from an address space management system the information indicating whether the electronic addresses in the address space have been assigned for use in the communication system.

9. The apparatus of claim 1, wherein the routing configuration validation module is further configured to determine a combined allocation and reachability status of the electronic addresses based on comparing the collected routing information with the information indicating whether the electronic addresses in the address space of the communication system have been assigned for use in the communication system, and to provide indications of the combined allocation and reachability status of the electronic addresses.

10. The apparatus of claim 9, further comprising:

a display operatively coupled to the routing configuration validation module, wherein the indications of the combined allocation and reachability status comprise status indications displayed on the display.

11. The apparatus of claim 10, wherein the displayed status indications comprise an address map, a position of a status indication for an electronic address in the address map corresponding to a value of the electronic address, and a color of a status indication for an electronic address in the address map corresponding to the combined allocation and reachability status of the electronic address.

12. A communication system comprising:

one or more routing elements for routing communication traffic in the communication system;

a routing configuration management system for managing routing configuration in the communication system; and a routing configuration validation system, operatively coupled to the each of the one or more routing elements and to the routing configuration management system, comprising the apparatus of claim 1.

13. A method of detecting possible misconfigurations in a communication system, the method comprising:

passively collecting routing information from routing protocol messages distributed by one or more routing elements in a communication system, the collected routing information indicating electronic addresses that are reachable in the communication system;

comparing the collected routing information with information indicating whether electronic addresses in an address space of the communication system have been assigned for use in the communication system; and detecting a possible misconfiguration of an electronic address where (i) the collected routing information indicates that the electronic address is reachable in the communication system and the information indicating whether the electronic addresses in the address space of the communication system have been assigned for use in the communication system indicates that the electronic address has not been assigned for use in the communication system, or (ii) the information indicating whether the electronic addresses in the address space of the communication system have been assigned for use in the communication system indicates that the electronic address has been assigned for use in the communication system and the collected routing information does not indicate that the electronic address is reachable in the communication system.

14. The method of claim 13, the collected routing information comprises one or more of: a reachable electronic address, a Classless Inter-Domain Routing (CIDR) block mask, a source electronic address of the routing element distributing the routing information, and an electronic address of a next hop from the source electronic address toward the reachable electronic address.

15. The method of claim 13, wherein collecting comprises:

establishing adjacencies with the one or more routing elements in the communication system; and extracting information from routing information received from the one or more routing elements.

16. The method of claim 13, further comprising:

determining, based on one or more of a source of the collected routing information and content of the collected routing information, whether the collected routing information should be compared with the information indicating whether the electronic addresses in the address space have been assigned for use in the communication system, wherein comparing comprises comparing the collected routing information responsive to determining that the routing information should be compared.

17. The method of claim 13, further comprising:

determining a combined allocation and reachability status of the electronic addresses based on the comparing, and displaying indications of the combined allocation and reachability status of the electronic addresses in an address map, a position of a status indication for an electronic address in the address map corresponding to a value of the electronic address, and a color of a status indication for an electronic address in the address map corresponding to the combined allocation and reachability status of the electronic address.

18. A computer-readable medium encoded with computer executable instructions which when executed by a computer cause the computer to perform the method of claim 13.

19. The apparatus of claim 2, wherein the address aggregator is further configured to track when the received information comprises different attributes associated with an electronic address.

20. The method of claim 13, further comprising:

tracking when the collected routing information comprises different attributes associated with an electronic address.

* * * * *

UNITED STATES PATENT AND TRADEMARK OFFICE
CERTIFICATE OF CORRECTION

PATENT NO.       : 7,619,989 B2                            Page 1 of 1
APPLICATION NO.  : 11/213010
DATED            : November 17, 2009
INVENTOR(S)      : Guingo et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 787 days.

Signed and Sealed this

Fourteenth Day of December, 2010

David J. Kappos
*Director of the United States Patent and Trademark Office*